(12) United States Patent
Hasegawa

(10) Patent No.: US 12,103,090 B2
(45) Date of Patent: Oct. 1, 2024

(54) INSERT AND CUTTING TOOL

(71) Applicant: KYOCERA CORPORATION, Kyoto (JP)

(72) Inventor: Mitsuru Hasegawa, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 539 days.

(21) Appl. No.: 17/438,465

(22) PCT Filed: Mar. 12, 2020

(86) PCT No.: PCT/JP2020/010847
§ 371 (c)(1),
(2) Date: Sep. 13, 2021

(87) PCT Pub. No.: WO2020/184667
PCT Pub. Date: Sep. 17, 2020

(65) Prior Publication Data
US 2022/0126375 A1    Apr. 28, 2022

(30) Foreign Application Priority Data

Mar. 14, 2019   (JP) ................................. 2019-047248

(51) Int. Cl.
*B23B 27/16*    (2006.01)
*B23B 27/14*    (2006.01)
(52) U.S. Cl.
CPC ........ *B23B 27/1611* (2013.01); *B23B 27/145* (2013.01); *B23B 2200/086* (2013.01); *B23B 2250/124* (2022.01)

(58) Field of Classification Search
CPC ........ B23B 2200/086; B23B 2260/072; B23B 27/145; B23B 27/1611; B23B 27/1618; B23B 27/1622; B23B 27/1651; B23B 2250/124; B23C 2200/086
See application file for complete search history.

(56) References Cited

U.S. PATENT DOCUMENTS

| 4,447,175 A | 5/1984 | Warren |
| 6,447,218 B1 | 9/2002 | Lagerberg |

(Continued)

FOREIGN PATENT DOCUMENTS

| EP | 1473102 A2 | 11/2004 |
| JP | 2002502711 A | 1/2002 |

(Continued)

*Primary Examiner* — Alan Snyder
(74) *Attorney, Agent, or Firm* — HAUPTMAN HAM, LLP

(57) ABSTRACT

An insert includes a base. The base includes first and second surfaces, and a cutting edge on at least a part of a ridgeline of the first and second surfaces. The first surface includes a groove away from the ridgeline and at an angle θ1 of 20-90° relative to the ridgeline. The groove extends from a first end part closest to the cutting edge to a second end part most away from the cutting edge. The groove includes an opening and a bottom surface. An angle θ2 formed by the bottom surface and a raised surface extended from the bottom surface toward the first end part is 95-135°. A cutting tool includes a holder, which has a length extending from a first end to a second end and includes a pocket located on a side of the first end, and the insert located in the pocket.

18 Claims, 13 Drawing Sheets

(56) References Cited

U.S. PATENT DOCUMENTS

| | | | |
|---|---|---|---|
| 2002/0136611 A1* | 9/2002 | Hartlohner | B23B 27/143 |
| | | | 407/116 |
| 2007/0077130 A1 | 4/2007 | Ley | |
| 2012/0082518 A1* | 4/2012 | Woodruff | B23P 15/34 |
| | | | 76/115 |
| 2012/0087746 A1 | 4/2012 | Fang et al. | |
| 2020/0009664 A1 | 1/2020 | Ikeda | |

FOREIGN PATENT DOCUMENTS

| | | |
|---|---|---|
| JP | 2002542951 A | 12/2002 |
| JP | 2013542083 A | 11/2013 |
| JP | 5843102 B2 | 1/2016 |
| JP | 6173211 B2 | 8/2017 |
| JP | 2017189825 A | 10/2017 |
| WO | 2018155705 A1 | 8/2018 |
| WO | 2018181272 A1 | 10/2018 |

* cited by examiner

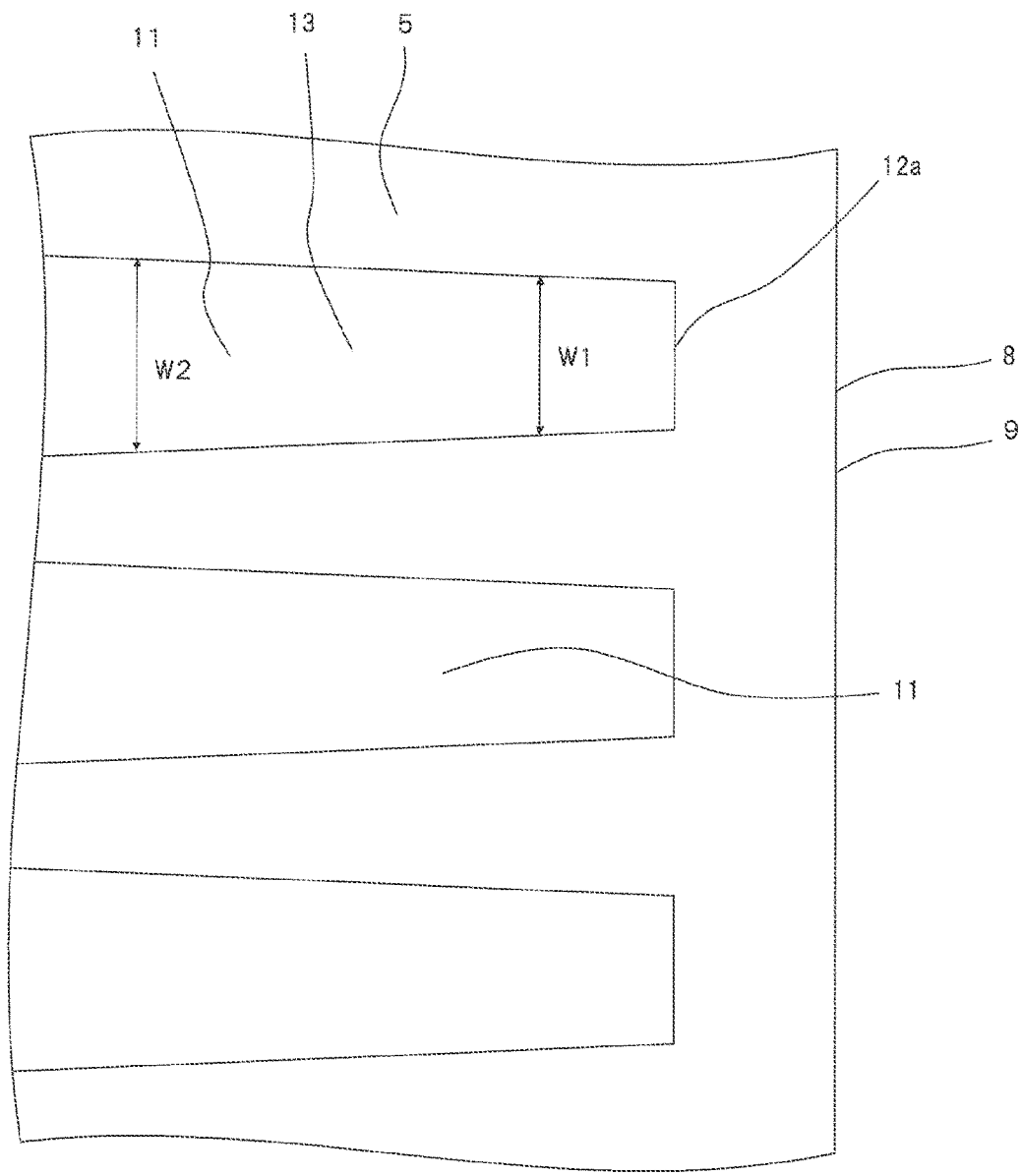

INSERT AND CUTTING TOOL

RELATED APPLICATIONS

The present application is a National Phase of International Application No. PCT/JP2020/010847 filed Mar. 12, 2020, which claims priority to Japanese Application No. 2019-047248, filed Mar. 14, 2019.

TECHNICAL FIELD

The present disclosure relates to an insert and a cutting tool.

BACKGROUND

Cemented carbide, cermet and ceramics are materials excellent in heat resistance and wear resistance, and are therefore used as an insert for a cutting tool. The insert is brought into contact with a workpiece in use at high speed, and the insert is therefore subjected to temperature rise.

For that reason, the insert and the workpiece are cooled with a coolant during a machining process. In order to enhance cooling effect thus obtained, a plurality of grooves that serve as a flow path for the coolant are disposed on a rake surface of the insert in Patent Document 1. A recess is disposed on a rake surface in Patent Document 2. These grooves or the recess is formed by, for example, grinding a part of a surface of sintered cemented carbide with a disk-shaped grindstone or a drill being rotated so as to remove a part of the cemented carbide. Alternatively, these grooves or the recess is formed by irradiating laser beam or electron beam to the surface of the cemented carbide so as to remove a part of the cemented carbide.

For example, in cases where the grooves are formed by using the disk-shaped grindstone, a bottom surface on a side of a cutting edge 9 in the groove 11 must become gradually shallower as coming closer to a side of the cutting edge as illustrated in FIG. 13A if the grooves and the cutting edge are disposed apart from each other. This is because the grindstone has a larger diameter relative to dimensions of the grooves. With this structure, however, the coolant is less likely to be supplied to a region near the cutting edge.

Also, in the case of using the laser beam or electron beam discussed in Patent Document 2, a wall surface of each of the grooves processed by the laser beam is relatively moderately raised, and has a structure that the coolant is less likely to be supplied to a region near the cutting edge. If the grooves are formed by the drill, an end surface on a side of the cutting edge 9 in the groove 11 is raised vertically relative to the bottom surface of the groove, resulting in a structure that hinders a flow of the coolant as illustrated in FIG. 13B.

RELATED ART DOCUMENT

Patent Documents

Patent Document 1: Japanese Patent No. 5843102
Patent Document 2: Japanese Patent No. 6173211

SUMMARY

Problems to be Solved by the Invention

An insert of the present disclosure includes a base. The base includes a first surface, a second surface connecting to the first surface, and a cutting edge located on at least a part of a ridgeline of the first surface and the second surface. The first surface includes a groove located at a position away from the ridgeline and at an angle $\theta1$ of 20-90° relative to the ridgeline. The groove is extended from a first end part being an end part closest to the cutting edge to a second end part being an end part most away from the cutting edge. The groove includes an opening and a bottom surface. An angle $\theta2$ formed by the bottom surface and a raised surface extended from the bottom surface toward the first end part is 95-135°.

A cutting tool of the present disclosure includes a holder, which has a length extending from a first end to a second end and includes a pocket located on a side of the first end, and the insert located in the pocket.

BRIEF DESCRIPTION OF THE DRAWINGS

FIG. 8 is an enlarged view of main parts on an upper surface illustrating an embodiment of the inserts in the present disclosure.

EMBODIMENTS

\<Inserts\>

Figure 1:
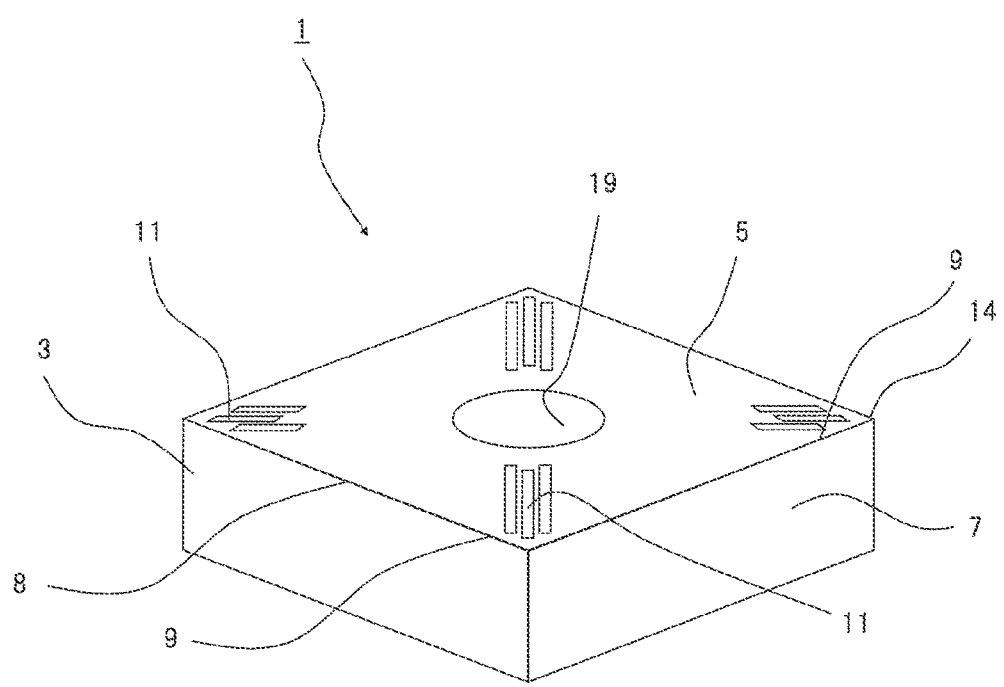
FIG. 1 is a perspective view illustrating an embodiment of inserts in the present disclosure.

Inserts in the present disclosure are described in detail below with reference to the drawings. For the sake of description, the drawings referred to in the following illustrate, in simplified form, only main members necessary for describing the embodiments. Hence, the inserts may include any arbitrary structural member not illustrated in the drawings referred to. Dimensions of the members in each of the drawings faithfully represent neither dimensions of actual structural members nor dimensional ratios of these members.

The insert 1 illustrated in FIG. 1 is an embodiment of an indexable cutting insert used by being attached to a predetermined position at a front end of a holder (not illustrated). The insert 1 includes a base 3 composed of cemented carbide, cermet, or the like.

The insert 1 may include the base 3 composed of a so-called cemented carbide including WC, and Co, Ni and Fe used for a binding phase. The use of the base 3 leads to excellent welding resistance with respect to metal including Ti. As used herein, "WC" denotes WC particles. The WC particles may have, for example, a mean particle diameter of 0.5-1.5 μm. The binding phase may be an iron group metal, such as Ni and Co. The base 3 may include 4-12 mass % of the binding phase. The base 3 may include only WC as a rest, besides the binding phase. In the present disclosure, a range, such as 4-12 mass %, denotes being a lower limit value or more and an upper limit value or less.

The insert 1 of the present disclosure has a polygonal plate shape, and includes a first surface 5 and a second surface 7 connecting to the first surface 5. The insert 1 also includes a cutting edge 9 located on at least a part of a ridgeline 8 of the first surface 5 and the second surface 7. The first surface 5 corresponds to a rake surface 5, and the second surface 7 corresponds to a flank surface 7 in FIG. 1. These are also true for the following drawings. The cutting edge 9 may be located on at least a part of the ridgeline 8 in the insert 1. Specifically, the cutting edge 9 may be located on portions corresponding to two sides, or may be located in a ring shape on the whole of an outer peripheral part of the first surface 5.

Dimensions of the insert 1 are not particularly limited. For example, a length of one side of the first surface 5 is settable to approximately 5-20 mm, and a height between the first surface 5 and a surface (lower surface) located on a side opposite to the first surface 5 is settable to approximately 3-20 mm.

Figure 2:
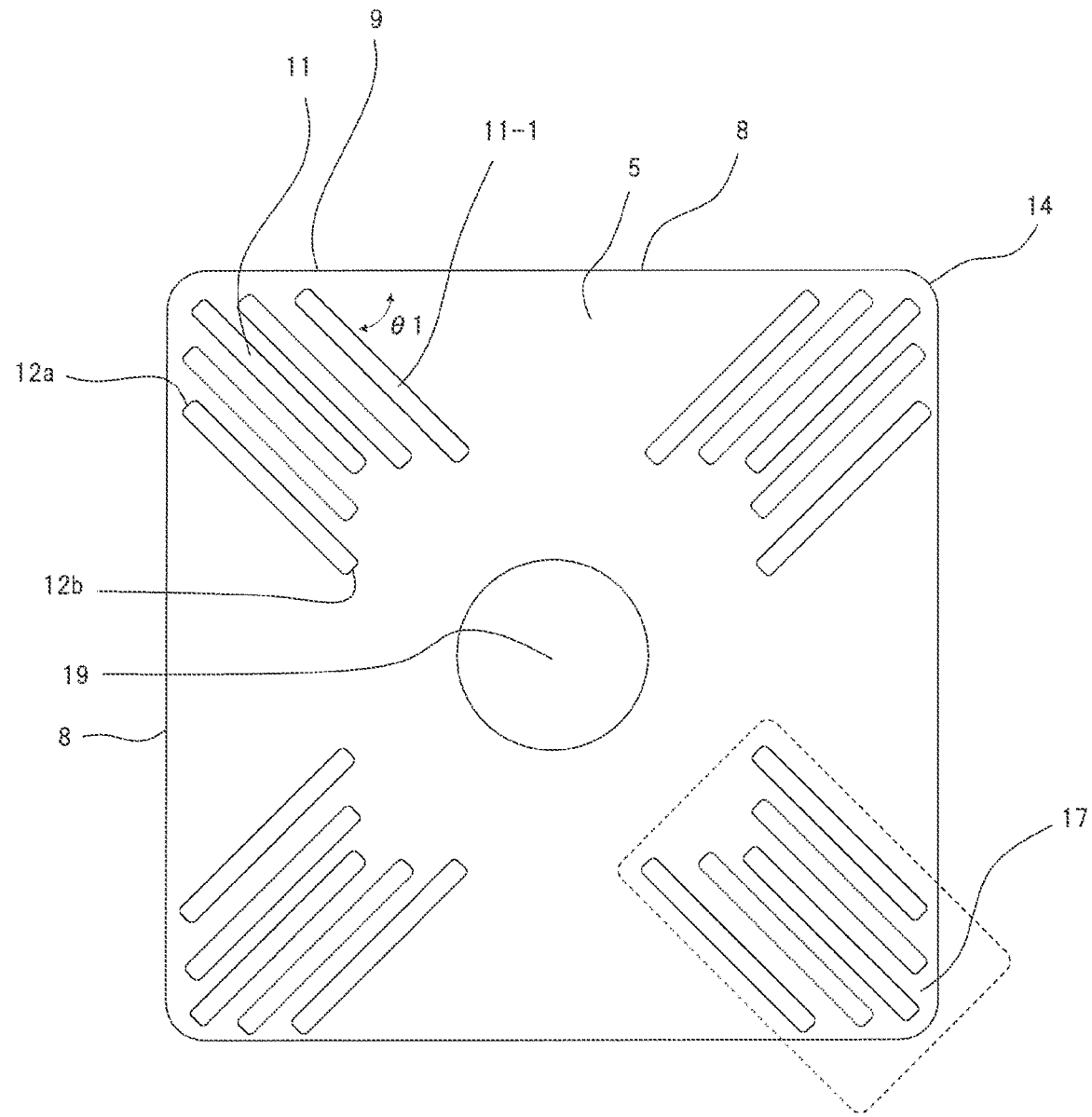
FIG. 2 is a top view illustrating an embodiment of the inserts in the present disclosure.

The insert 1 of the present disclosure includes a groove 11 at a position away from the ridgeline 8 on the first surface 5 as in the top view of FIG. 2. The groove 11 is extended from a first end part 12a that is an end part being closest to the ridgeline 8 toward a second end part 12b that is an end part most away from the cutting edge 9. The groove 11 is located at an angle θ1 of 20-90° relative to the ridgeline 8. As used herein, the angle relative to the ridgeline 8 of the groove 11 denotes a smaller angle from among angles at which an extending direction of the groove 11 intersects with the ridgeline 8. A plurality of grooves 11 may be disposed on the first surface 5. Of these grooves 11, at least one of the grooves 11 may be located at the angle θ1 of 20-90° relative to the ridgeline 8. That is, all of the grooves 11 need not satisfy the above relationship.

By setting the angle θ1 to 20-90°, chips are less likely to stay in the groove 11, and the chips tend to be discharged along the groove 11. A groove 11-1 in FIG. 2 is disposed at an angle of approximately 45° relative to the cutting edge 9.

Figure 3:
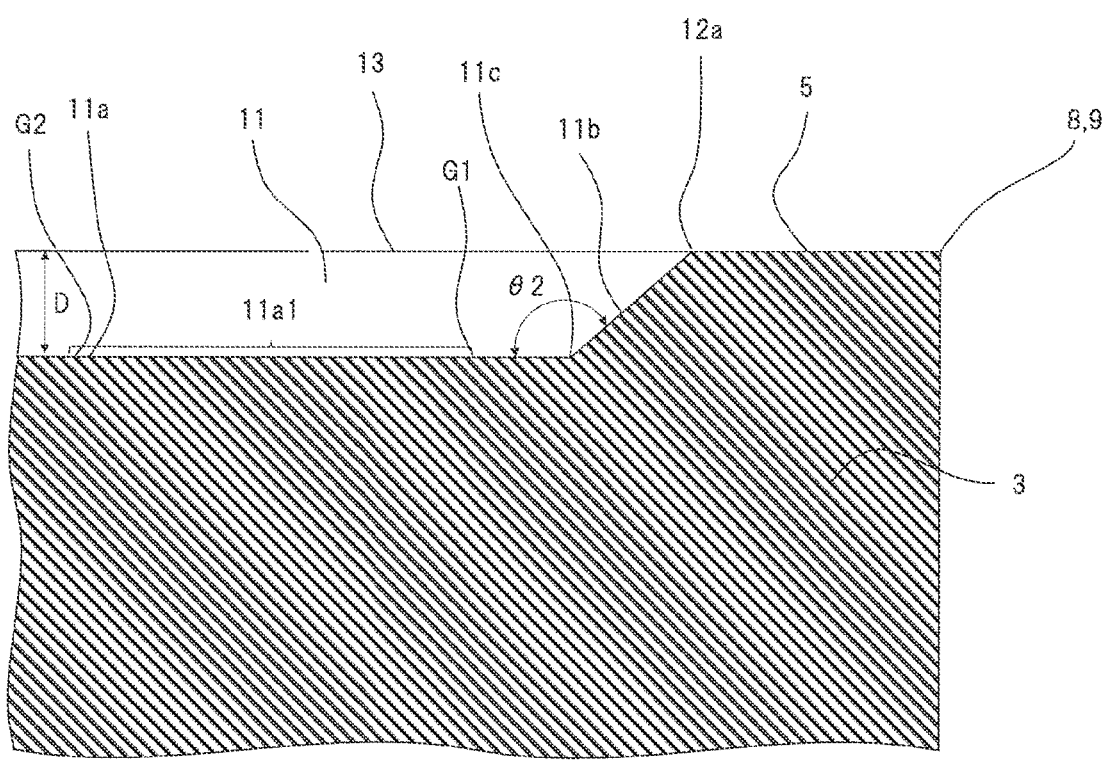
FIG. 3 is a sectional view of main parts illustrating an embodiment of the inserts in the present disclosure.

FIG. 3 is a sectional view of the insert 1 along the extending direction of the groove 11. The cutting edge 9 is located on a right side in FIG. 3. The groove 11 includes an opening 13 at a position that is an imaginary surface of the first surface 5. Chips (not illustrated) of a workpiece (not illustrated) move from right to left in FIG. 3. The insert 1 of the present disclosure includes the groove 11, and therefore has a small contact area between the chips and the insert 1, thus reducing friction between the chips and the insert 1.

The groove 11 includes a bottom surface 11a at a position lower than the opening 13 in the insert 1 of the present disclosure. The groove 11 also includes a raised surface 11b extended from the bottom surface 11a toward the first end part 12a. An angle θ2 formed by the bottom surface 11a and the raised surface 11b is 95-135°.

When supplying a coolant (not illustrated) to the groove 11, the coolant flows from left to right along the groove 11.

With the insert 1 of the present disclosure including the above configuration, the coolant is easy to pass through the groove 11, and a larger amount of the coolant can be supplied to the vicinity of the cutting edge 9.

Because the angle θ2 is 95° or more, force of the coolant that has already arrived at the raised surface 11b is less likely to become weaker. Because the angle θ2 is 135° or less, a volume of the groove 11 in the vicinity of the raised surface 11b may not become too small, thereby making it possible to supply a large amount of the coolant to the cutting edge 9. The angle ∝2 may be 100° or more. The angle θ2 may be 105° or more. The angle θ2 may be 130° or less. The angle θ2 may be 125° or less. The angle θ2 may be 110-125°. The insert 1 thus configured is excellent in supply of the coolant.

Figure 4:
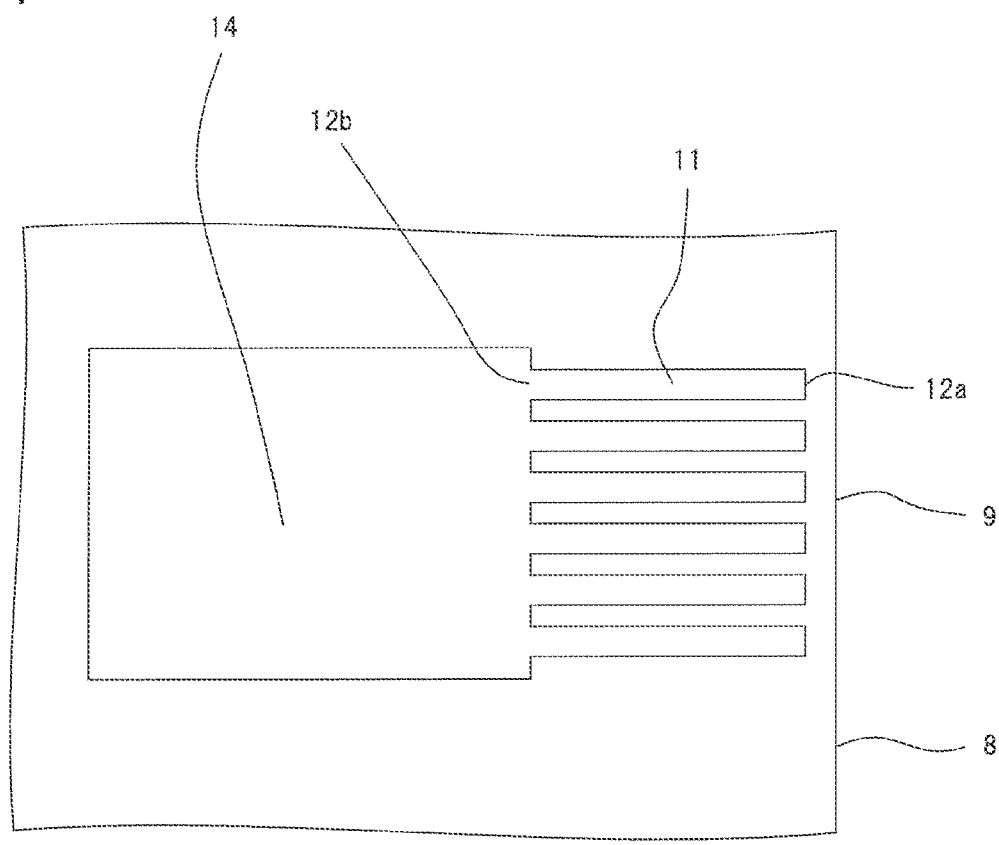
FIG. 4 is an enlarged view of main parts on an upper surface illustrating an embodiment of the inserts in the present disclosure.

The raised surface 11b is located on a side of the first end part 12a of the groove 11, whereas no raised surface may be located on a side of the second end part 12b of the groove 11. For example, the groove 11 may be connected to, for example, other space, such as a concave part 15, in the second end part 12b, and the second end part 12b in the groove 11 may be opened as illustrated in FIG. 4.

An angle formed by the bottom surface 11a and an imaginary surface along the cutting edge may be 0-5° in the insert 1 of the present disclosure. This configuration ensures that the groove 11 has enhanced capability to hold the coolant.

A distance between the groove 11 and the ridgeline 8 may be 40-700 μm in the insert 1 of the present disclosure. The cutting edge 9 is less prone to fracture by setting the distance between the groove 11 and the ridgeline 8 to 40 μm or more. Cutting force is low by setting the distance between the groove 11 and the ridgeline 8 to 700 μm or less.

The distance between the groove 11 and the ridgeline 8 may be set to 50-120 μm. With this configuration, the cutting edge 11 of the insert 1 is less prone to fracture and the cutting force is low.

The distance between the groove 11 and the ridgeline 8 may be obtained by measuring a minimum distance between the groove 11 and the ridgeline 8. The insert 1 of the present disclosure may include one in which one of the grooves 11 is connected to the ridgeline 8.

Figure 5:
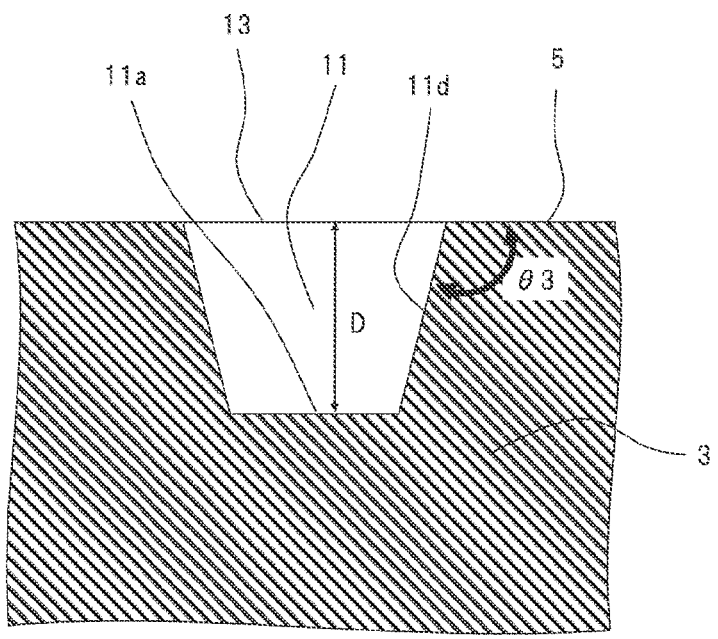
FIG. 5 is an enlarged view of main parts illustrating an embodiment of the inserts in the present disclosure.

FIG. 5 is a cross section of the insert 1 that intersects at right angles in the extending direction of the groove 11. The groove 11 includes a lateral surface 11d extended from the bottom surface 11a to the opening 13. An angle θ3 formed by an imaginary surface along the cutting edge 9 and the lateral surface 11d in the base 3 may be 90° or more and smaller than the angle θ2.

This configuration makes it easier for the lateral surface 11d to hold the coolant inside the groove 11 than the raised surface 11b. It is therefore possible to efficiently supply the coolant to the vicinity of the cutting edge 9. The angle θ3 may be smaller than 115°. The angle θ3 may be smaller than 110°. The angle θ3 may be 95° or less because the angle θ3 is preferably closer to 90°.

Figure 6:
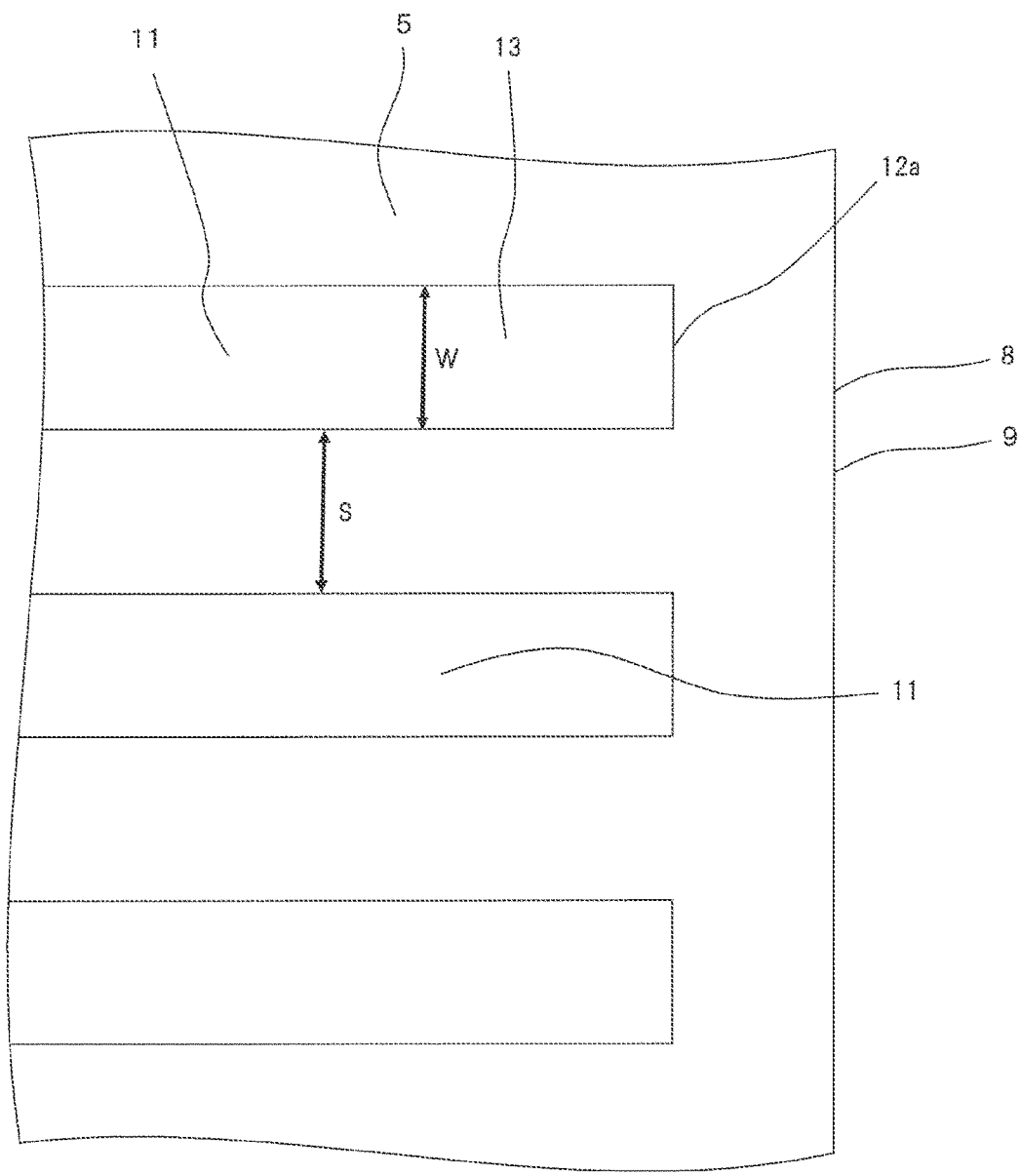
FIG. 6 is an enlarged view of main parts on an upper surface illustrating an embodiment of the inserts in the present disclosure.

FIG. 6 is an enlarged view of a neighborhood of the ridgeline 8 if the first surface 5 is viewed from above. The grooves 11 are located at the angle θ1 of 90° relative to the ridgeline 8 that is the cutting edge 9 in an embodiment of FIG. 6. The grooves 11 are disposed side by side, and the grooves 11 may have a width W of 50-700 μm. A depth D (refer to FIG. 5 with regard to "D", and the depth is a length in a depth direction in FIG. 6) may be 20-700 μm. Spacing S between the grooves 11 adjacent to each other may be 50-700 μm. An average value of the widths W of the grooves 11 and an average value of the depths D of the grooves 11 may fall within the above range.

The insert 1 thus configured has low cutting force and has excellent fracture resistance. The insert 1 is capable of carrying out a high-speed machining process because of being excellent in cooling effect.

Specifically, with the insert 1 including the grooves 11 thus configured, friction between the first surface 5 and chips of the workpiece is low, resulting in low cutting force. Additionally, the cutting edge 9 located on the ridgeline 8 has excellent fracture resistance because the grooves 11 do not reach the ridgeline 8. The grooves 11 serve as a micro channel for the coolant if the coolant is supplied toward the cutting edge 9, and it is therefore possible to carry out a high-speed machining.

The width W of the grooves 11 may be 50-200 μm. The depth D may be 50-200 μm. The spacing S may be 50-200 μm.

A ratio (S/W) of the spacing S of the grooves 11 adjacent to each other to the width W of the grooves 11 may be 0.9-2.0 in the insert 1 of the present disclosure. With this configuration, the insert 1 has an excellent balance between friction resistance and cooling effect.

A ratio (D/W) of the depth D of the grooves 11 to the width W of the grooves 11 may be 0.5-2.0 in the insert 1 of the present disclosure. With this configuration, the insert 1 has an excellent balance between friction resistance and cooling effect. Chips are less likely be caught in the grooves 11, thereby making it easier to maintain performance of the insert 1.

Figure 7A:
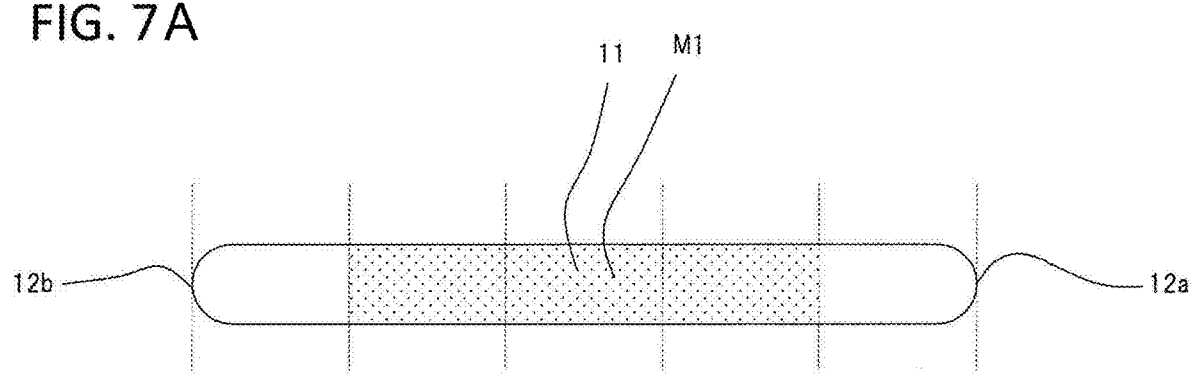
FIG. 7A and FIG. 7B are schematic diagrams of a groove illustrating an embodiment of the inserts in the present disclosure.

As used herein, the width W of the grooves 11 in the present disclosure denotes an average value of the widths W of the grooves 11. That is, if the grooves 11 have approximately the same width W from the first end part 12a to the second end part 12b as illustrated in FIG. 7A, the grooves 11 are divided into five in the extending direction thereof, and the average value of the widths W of the grooves 11 in a region M1 having a length of 20-80% as viewed from the first end part 12a is obtained.

Figure 7B:
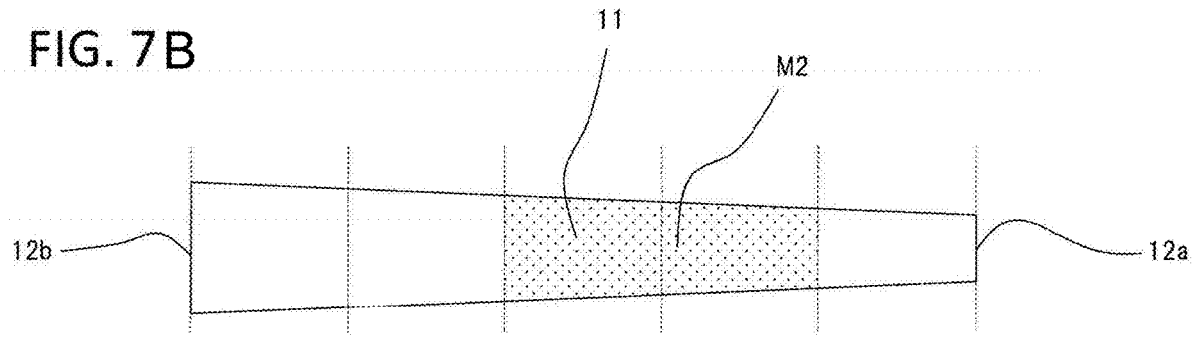

If the widths of the grooves 11 are changed at an approximately constant rate from the first end part 12a to the second end part 12b as illustrated in FIG. 7B, the grooves 11 are divided into five in the extending direction thereof, and an average value of the widths W of the grooves 11 in a region M2 having a length of 20-60% as viewed from the first end part 12a is obtained. The reason for measuring the W in the regions of the grooves 11 which are located near the first end part 12a is that the insert 1 of the present disclosure is capable of producing operational effects as long as the widths W of the grooves 11 in the region near the cutting edge 9 fall within the range set to the insert 1 of the present disclosure.

The depths D of the grooves 11 and the spacings S of the grooves 11 adjacent to each other may be measured according to similar standards.

A width W of the opening 13 of each of the grooves 11 may become smaller on a side of the cutting edge 9 in the insert 1 of the present disclosure as illustrated in FIG. 8. With this configuration, a percentage of area occupied by the grooves 11 becomes smaller on the side of the cutting edge 9, thus leading to enhanced wear resistance on a side of the cutting edge 9.

As illustrated in FIG. 8, W1 indicates a width of the groove 11 at a position located 0.5 mm away from the first end part 12a on the side of the cutting edge 9 in the groove 11, and W2 indicates a width of the groove 11 at a position located 2.0 mm away from the first end part 12a of the groove 11. It may be set to W1<W2. With this configuration, the width of the groove 11 becomes small in the vicinity of the first end part 12a, and the coolant is therefore likely to be discharged vigorously from the groove 11.

Figure 9:
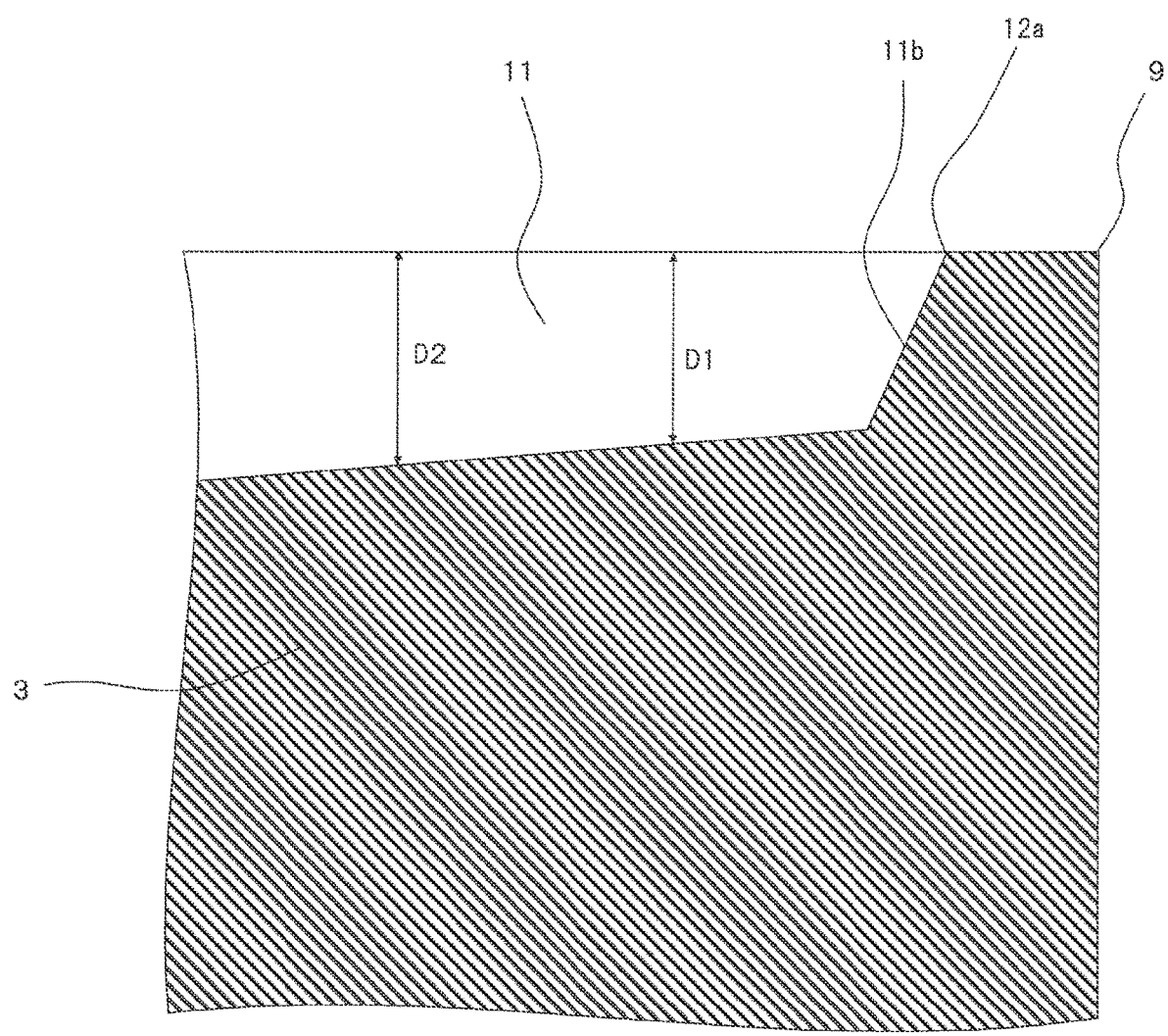
FIG. 9 is a sectional view of main parts illustrating an embodiment of the inserts in the present disclosure.

As illustrated in FIG. 9, D1 indicates a depth of the groove 11 at a position located 0.5 mm away from the first end part 12a on the side of the cutting edge 9 in the groove 11, and D2 indicates a depth of the groove 11 at a position located 2.0 mm away from the first end part 12a of the groove 11. It may be set to D1<D2. With this configuration, the depth of the groove 11 becomes small in the vicinity of the first end part 12a, and the coolant is therefore likely to be discharged vigorously from the groove 11.

The groove 11 may satisfy a relationship of (D2/D1)>(W2/W1). With this configuration, a change in the depth D of the groove 11 is larger than a change in the width W of the groove 11, and the coolant is therefore likely to be discharged vigorously from the groove 11.

A shape of the groove 11 (hereinafter also referred to as a cross-sectional shape of the groove 11) in a cross section of the base 3 which intersects at right angles in the extending direction of the groove 11 may be a shape in which a width of the opening 13 is larger than a width of the bottom surface 11a, such as a semicircular shape, a triangular shape, or a trapezoidal shape.

For example, a coating layer (not illustrated) including a TiCN layer (not illustrated) or an $Al_2O_3$ layer (not illustrated) may be disposed on a surface of the base 3 in the insert 1 of the present disclosure. As illustrated in FIG. 2, the base 3 may be exposed on at least a first region 17 surrounding the cutting edge 9 and the grooves 11 on the first surface 5 in the insert 1 of the present disclosure. In other words, the coating layer may not be present on the surface of the base 3 in the first region 17. As used herein, the first region 17 denotes a range located within 0.5 mm from the cutting edge 9 and the grooves 11. Alternatively, the coating layer may not be present on the entire surface of the base 3. The first region 17 denotes a region of the first surface 5 almost surrounded by a broken line in FIG. 2.

With this configuration, it is possible to prevent the workpiece from being welded to the insert 1 even in the case of machining metal including, for example, titanium having high welding performance.

For example, after manufacturing cemented carbide in the shape of the insert including no grooves 11 in the insert 1 of the present disclosure, the raised surface 11b may be formed so as to serve as the grooves 11 in the insert 1 of the present disclosure by using a drill or laser beam. Alternatively, the insert 1 is also obtainable by manufacturing a molded body including concave parts that serve as the grooves after sintering by using a mold including convex parts corresponding to the grooves 11, followed by sintering the molded body.

A method for measuring the angle θ2 is described below. It is possible to measure the angle θ2 by using, for example, a shape analysis laser microscope. The measuring is made using VK-X1000 manufactured by KEYENCE CORPORATION in the present disclosure. Measurement conditions are as follows.

Measurement mode: Simple measurement
Scanning mode: Focus variation
Measurement size: Standard
Pitch: 4.50 μm
Brightness: 70
To enable noise region processing: ON
Coaxial vertical: 100
Ring illumination: OFF
Z-axis mode: Recommended setting
Z measurement distance fixing: OFF Automatic upper and lower limits: ON
Head: R
Objective lens name: Plan
Objective lens magnification: 10×
NA: 0.3
WD: 16.5 mm
Brightness mode: Automatic
Brightness (automatic): 70
Brightness (manual): 2
Edge enhancement: 5

After a three-dimensional structure of the groove 11 is measured under the above conditions, an angle θ2 formed by the bottom surface 11a and the raised surface 11b is obtained along the extending direction of the groove 11.

Of a position G1a located 200 μm away from the first end part 12a in the extending direction of the groove 11, and a position G1b located 50 μm away from a boundary 11c between the bottom surface 11a and the raised surface 11b, a position located away from the boundary 11c toward the second end part 12b is a measurement start point G1. A position located 300 μm away from the measurement start point G1 toward the second end part 12b is a measurement termination point G2. The bottom surface 11a from G1 to G2 is a reference bottom surface 11a1.

Subsequently, an angle θ2 of the raised surface 11b relative to the reference bottom surface 11a1 is obtained. If the raised surface 11b has a shape similar to a plane as illustrated in FIG. 3, the θ2 may be obtained as it is. If the raised surface includes some irregularities, the θ2 may be obtained by forming an approximate line.

Figure 10:
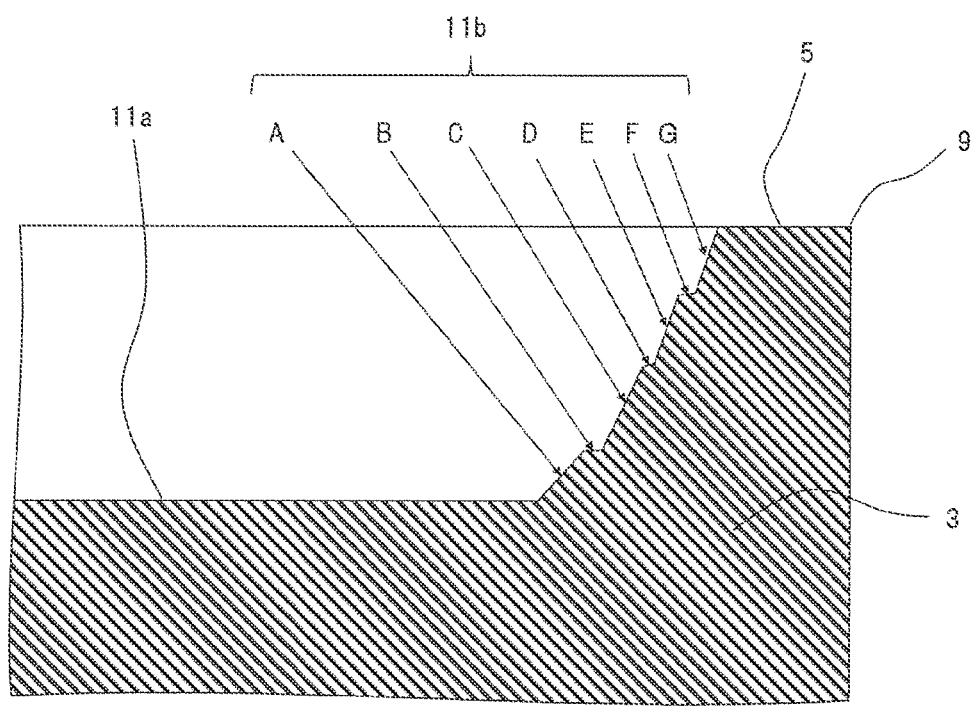
FIG. 10 is a sectional view of main parts illustrating an embodiment of the inserts in the present disclosure.

The raised surface 11b may include a part whose angle formed by the reference bottom surface 11a1 is beyond a range of 95-135° in the insert 1 of the present disclosure. For example, regions B, D and F on the raised surface 11b in FIG. 10 individually have an angle θ2 relative to the bottom surface 11a which is larger than 135°. Regions A, C, E and G individually have an angle θ2 relative to the bottom surface 11a which falls within the range of 95-135°. If the part whose angle relative to the reference bottom surface 11a1 falls within the range of 95-135° occupies 50% or more of the raised surface 11b as in the embodiment illustrated in FIG. 10, a determination is made that the θ2 is 95-135°.

<Cutting Tools>

Cutting tools of the present disclosure are described below with reference to the drawings.

Figure 11:
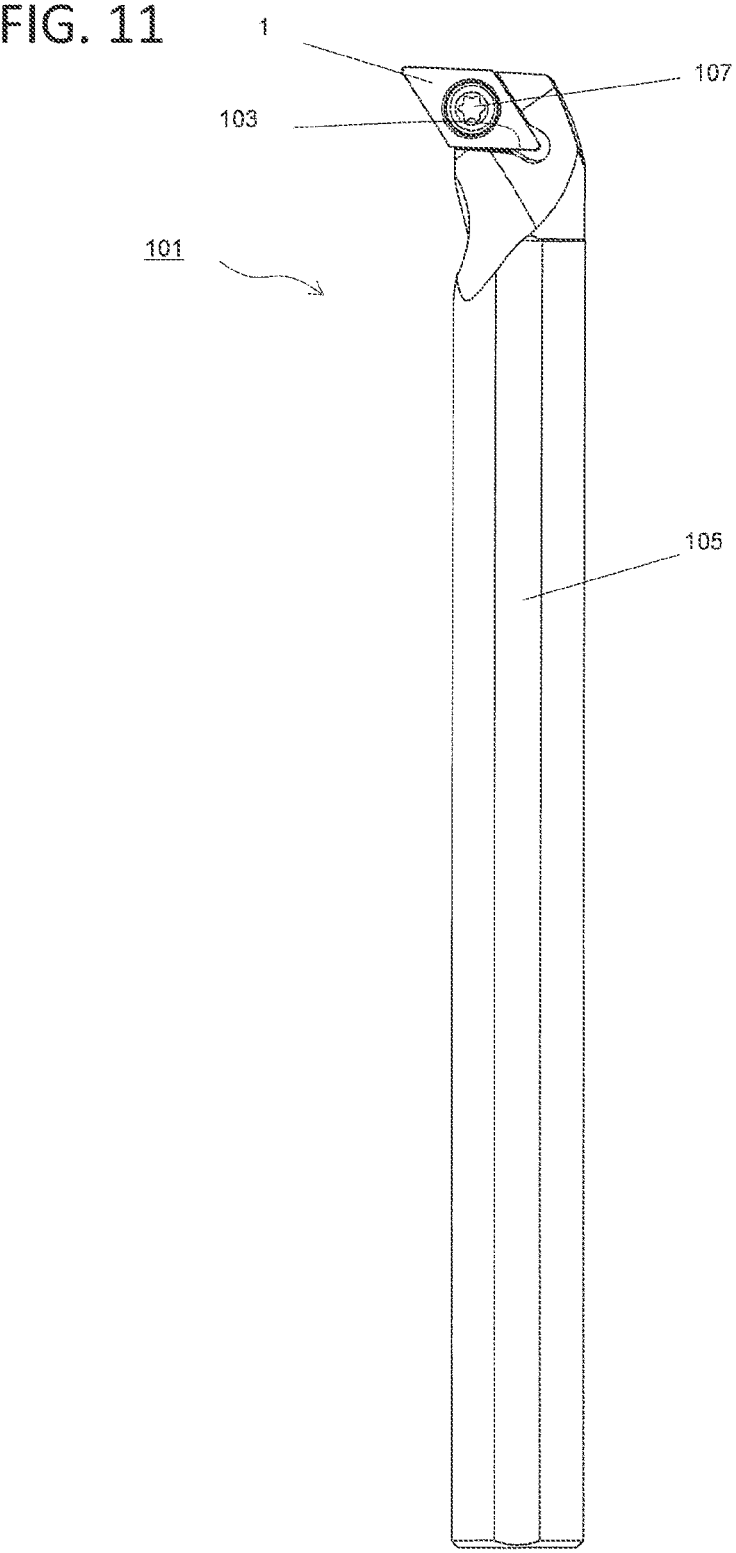
FIG. 11 is a plan view illustrating an embodiment of cutting tools in the present disclosure.

The cutting tool 101 of the present disclosure is, for example, a bar-shaped body extended from a first end (an upper end in FIG. 11) to a second end (a lower end in FIG. 11) as illustrated in FIG. 11.

The cutting tool 101 includes a holder 105 which has a length from the first end (front end) to the second end, and which includes a pocket located on a side of the first end, and the insert 1 located in the pocket 103 as illustrated in FIG. 11. The cutting tool 101 includes the insert 1 and is therefore capable of performing a stable machining process for a long term. The grooves 11 are omitted in FIG. 11.

The pocket 103 is a part which permits attachment of the insert 1 and which includes a seating surface parallel to a lower surface of the holder 105, and a constraining lateral surface vertical or inclined relative to the seating surface. The pocket 103 opens on a side of the first end of the holder 105.

The insert 1 is located in the pocket 103. The lower surface of the insert 1 may be directly in contact with the pocket 103. Alternatively, a sheet (not illustrated) may be held between the insert 1 and the pocket 103.

The insert 1 is attached to the holder 105 in the following manner. That is, at least a part of a ridgeline where the first surface 5 being the rake surface 5 intersects with the second surface 7 being the flank surface 7 which is used as the cutting edge 9 is protruded outward from the holder 105. The insert 1 is attached to the holder 105 by a screw 107 in the present embodiment. Specifically, the insert 1 is attached to the holder 105 by inserting the screw 107 into a through hole 19 of the insert 1, and by inserting a front end of the screw 107 into a screw hole (not illustrated) formed in the pocket 103 so as to engage screw parts each other.

The cutting tool 101 of the present disclosure may include a hose (not illustrated) whose front end includes a nozzle in order to supply a coolant to the cutting edge 9. A pump for supplying the coolant is connected to the hose.

Figure 12:
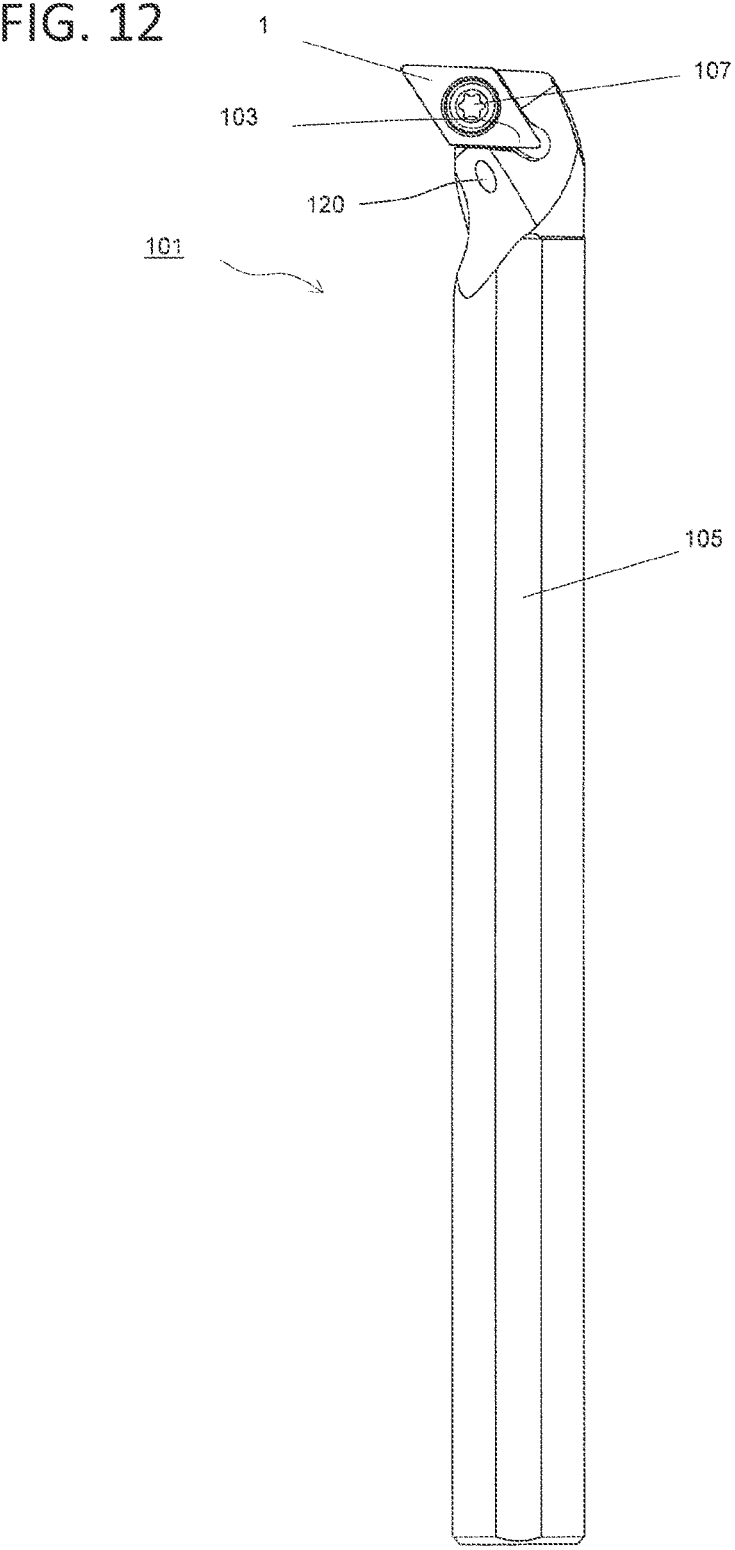
FIG. 12 is a plan view illustrating an embodiment of the cutting tools in the present disclosure.
Figure 13A:
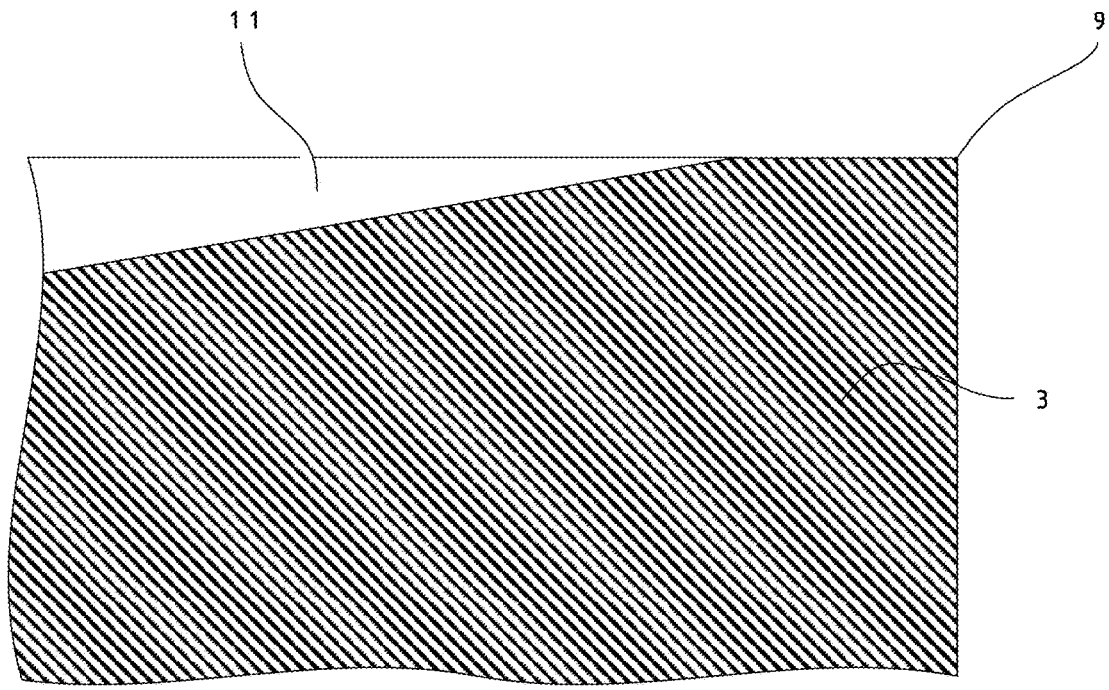
FIG. 13A and FIG. 13B are sectional views of main parts of a conventional insert.
Figure 13B:
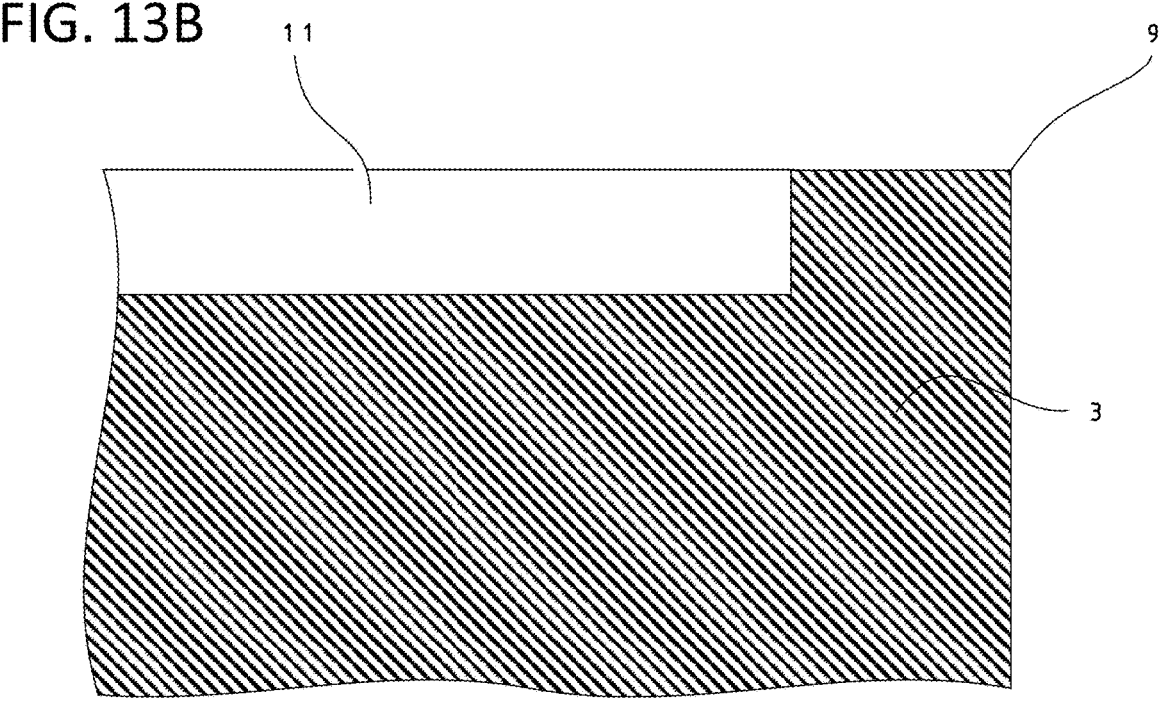

The holder 105 may include the nozzle 120 for supplying the coolant to the cutting edge 9 in the cutting tool 101 of the present disclosure as illustrated in FIG. 12. A spout of the nozzle 120 located near the insert 1 facilitates the supply of the coolant to the cutting edge 9. The nozzle 120 may be fixed to a part of the holder 105. Alternatively, the holder 105 may include a hole used as the nozzle 120 as illustrated in FIG. 12. The coolant discharged from the nozzle 120 may be, for example, an aqueous coolant or oil based coolant.

The nozzle 120 may be connected to the pump (not illustrated) so as to carry out a discharge at a pressure of 0.5-20 MPa. Particularly, a higher-speed machining is achievable at a pressure of 10 MPa or more.

For example, steel and cast iron are usable as a material of the holder 105. Of these materials, steel having enhanced toughness may be used.

The cutting tool for use in a so-called turning process is illustrated in the embodiment. Examples of the turning process include internal process, external process and grooving process. The cutting tool is not limited to ones which are used for the turning process. For example, the insert 1 of the above embodiment may be used as a cutting tool used for milling process.

EXAMPLES

Examples of the inserts of the present disclosure are described below. The inserts of the present disclosure include a base composed of cemented carbide including WC and a binding phase.

Different grooves were formed on the rake surface of the base in the shape of SNGN120408 in these examples. Inserts including no grooves were also manufactured as a reference example.

Using the inserts that were different in shape, a workpiece (Ti-6Al-4V) was cut out to examine a relationship between the shape of the groove and the life of the insert, as well as a relationship between pressure of a coolant discharged from the nozzle and the life of the insert.

Table 1 presents the presence/absence of groove, the shape of groove, the kind of the insert used, coolant pressure, and evaluation of machining. A relation between groove and cutting edge corresponds to a shape in which the grooves are extended toward a corner part as illustrated in FIGS. 1 and 2.

The cutting conditions are described below.

<Cutting Conditions>

Cutting speed: 100 m/min
Feed rate: 0.1 mm/rev
Depth of cut: 0.5 mm

Others: Using water-soluble coolant
Coolant pressure: 10 MPa
Evaluation Item: Cutting distance until a cutting edge falls off

TABLE 1

| Sample No. | θ2 (°) | θ3 (°) | Clearance (μm) | Width W (μm) | Spacing S (μm) | Depth D (μm) | S/W | D/W | Cutting distance (m) | Condition of cutting edge |
|---|---|---|---|---|---|---|---|---|---|---|
| 1 | — | 115 | 0 | 100 | 100 | 100 | 1.00 | 1.00 | 10 | fracture |
| 2 | 115 | 115 | 40 | 100 | 100 | 100 | 1.00 | 1.00 | 3900 | good |
| 3 | 115 | 115 | 50 | 100 | 100 | 100 | 1.00 | 1.00 | 4400 | good |
| 4 | 90 | 90 | 100 | 100 | 100 | 100 | 1.00 | 1.00 | 2400 | good |
| 5 | 93 | 90 | 100 | 100 | 100 | 100 | 1.00 | 1.00 | 2450 | good |
| 6 | 95 | 95 | 100 | 100 | 100 | 100 | 1.00 | 1.00 | 2600 | good |
| 7 | 100 | 100 | 100 | 100 | 100 | 100 | 1.00 | 1.00 | 3200 | good |
| 8 | 110 | 110 | 100 | 100 | 100 | 100 | 1.00 | 1.00 | 4000 | good |
| 9 | 115 | 90 | 100 | 100 | 100 | 100 | 1.00 | 1.00 | 5000 | good |
| 10 | 115 | 115 | 100 | 100 | 100 | 100 | 1.00 | 1.00 | 4800 | good |
| 11 | 115 | 130 | 100 | 100 | 100 | 100 | 1.00 | 1.00 | 4500 | good |
| 12 | 125 | 125 | 100 | 100 | 100 | 100 | 1.00 | 1.00 | 3900 | good |
| 13 | 135 | 95 | 100 | 100 | 100 | 100 | 1.00 | 1.00 | 3600 | good |
| 14 | 135 | 135 | 100 | 100 | 100 | 100 | 1.00 | 1.00 | 3200 | good |
| 15 | 135 | 160 | 100 | 100 | 100 | 100 | 1.00 | 1.00 | 2800 | good |
| 16 | 140 | 140 | 100 | 100 | 100 | 100 | 1.00 | 1.00 | 2500 | good |
| 17 | 160 | 160 | 100 | 100 | 100 | 100 | 1.00 | 1.00 | 2400 | good |
| 18 | 115 | 115 | 700 | 100 | 100 | 100 | 1.00 | 1.00 | 3500 | good |
| 21 | 115 | 115 | 100 | 50 | 100 | 100 | 2.00 | 2.00 | 3800 | good |
| 22 | 115 | 115 | 100 | 200 | 100 | 100 | 0.50 | 0.50 | 3000 | good |
| 23 | 115 | 115 | 100 | 700 | 100 | 100 | 0.14 | 0.14 | 2800 | good |
| 26 | 115 | 115 | 100 | 100 | 50 | 100 | 0.50 | 1.00 | 2900 | good |
| 27 | 115 | 115 | 100 | 100 | 200 | 100 | 2.00 | 1.00 | 3000 | good |
| 28 | 115 | 115 | 100 | 100 | 700 | 100 | 7.00 | 1.00 | 2600 | good |
| 31 | 115 | 115 | 100 | 100 | 100 | 50 | 1.00 | 0.50 | 2800 | good |
| 32 | 115 | 115 | 100 | 100 | 100 | 200 | 1.00 | 2.00 | 3800 | good |
| 33 | 115 | 115 | 100 | 100 | 100 | 700 | 1.00 | 7.00 | 3400 | good |

A surface of the base was exposed and no so-called coating film was disposed in all of samples presented in Table 1. A similar evaluation was made on samples including the coating film, and the results indicated that these samples had lower welding performance than those including no coating film.

The cutting edge was fractured immediately after starting machining in Sample No. 1 in which the grooves reached the ridgeline. A cutting distance was relatively short in Sample Nos. 4 and 5 in which the angle θ2 formed by the bottom surface and the raised surface was less than 95°, and Sample Nos. 16 and 17 in which the angle θ2 formed by the bottom surface and the raised surface exceeded 135°.

In contrast, the inserts and the cutting tools each having the configuration of the present disclosure had a long life. The relationship between coolant pressure and cutting distance was examined on Sample No. 7 in Table 1. The results indicated that the cutting distance became longer with increasing the coolant pressure. There was a slight change in cutting distance if the coolant pressure was 10 MPa or more.

The inserts of the present disclosure and the cutting tools respectively using the inserts are not limited to the above configuration, and various improvements and changes may be made without departing from the scope of the present disclosure.

The invention claimed is:
1. An insert, comprising:
a base comprising
a first surface having
a first corner defined by two adjacent edges of the first surface, and
a plurality of grooves,
a second surface connecting to the first surface, and
a cutting edge located on at least a part of a ridgeline of the first surface and the second surface, wherein
the plurality of grooves is located at a position away from the ridgeline and at an angle θ1 of 20-90° relative to the ridgeline,
each of the plurality of grooves has a first end part being an end part closest to the cutting edge and a second end part being an end part most away from the cutting edge, and extends from the first end part to the second end part,
the plurality of grooves is arranged in parallel to each other and extends toward the first corner of the first surface,
each of the plurality of grooves comprises
an opening,
a bottom surface, and
a raised surface extended from the bottom surface toward the first end part, and
an angle θ2 formed by the bottom surface and the raised surface is 95-135°.
2. The insert according to claim 1, wherein
each of the plurality of grooves further comprises a lateral surface extended from the bottom surface to the opening, and
an angle θ3, which is on the base and which is formed by an imaginary surface along the cutting edge and the lateral surface, is 90° or more and is smaller than the angle θ2.
3. The insert according to claim 1, wherein
the plurality of grooves is located side by side,
a width W of the opening of each of the plurality of grooves is 50-700 μm,
a depth D of said each of the plurality of grooves is 20-700 μm, and spacing S between grooves adjacent to each other among the plurality of grooves is 50-700 μm.

4. The insert according to claim 1, wherein a relationship of W1<W2 is satisfied in which
W1 is a width of the opening of a groove of the plurality of grooves at a position located 0.5 mm away from the first end part of the groove, and
W2 is a width of the opening at a position located 2.0 mm away from the first end part of the groove.

5. The insert according to claim 1, wherein a relationship of D1<D2 is satisfied in which
D1 is a depth of a groove of the plurality of grooves at a position located 0.5 mm away from the first end part of the groove, and
D2 is a depth of the groove at a position located 2.0 mm away from the first end part of the groove.

6. The insert according to claim 1, wherein a relationship of (D2/D1)>(W2/W1) is satisfied in which
W1 is a width of the opening of a groove of the plurality of grooves at a position located 0.5 mm away from the first end part of the groove, and W2 is a width of the opening at a position located 2.0 mm away from the first end part of the groove, and
D1 is a depth of the groove at the position located 0.5 mm away from the first end part of the groove, and
D2 is a depth of the groove at the position located 2.0 mm away from the first end part of the groove.

7. The insert according to claim 1, wherein a maximum width of a groove of the plurality of grooves is a width W of the opening.

8. The insert according to claim 1, wherein the base is exposed in a first region of the first surface in a range within 0.5 mm from the cutting edge and the plurality of grooves.

9. A cutting tool, comprising:
a holder which has a first end, a second end and a length extending from the first end to the second end, and which comprises a pocket located on a side of the first end; and
an insert being located in the pocket,
the insert comprising:
a base comprising
a first surface having
a first corner defined by two adjacent edges of the first surface, and
a plurality of grooves,
a second surface connecting to the first surface, and
a cutting edge located on at least a part of a ridgeline of the first surface and the second surface, wherein
the plurality of grooves is located at a position away from the ridgeline and at an angle θ1 of 20-90° relative to the ridgeline,
each of the plurality of grooves has a first end part being an end part closest to the cutting edge and a second end part being an end part most away from the cutting edge, and extends from the first end part to the second end part,
the plurality of grooves is arranged in parallel to each other and extends toward the first corner of the first surface,
each of the plurality of grooves comprises
an opening,
a bottom surface, and
a raised surface extended from the bottom surface toward the first end part, and
an angle θ2 formed by the bottom surface and the raised surface is 95-135°.

10. The cutting tool according to claim 9, wherein the holder comprises a flow path for passage of a coolant.

11. An insert, comprising:
a base comprising
a first surface,
a second surface connecting to the first surface, and
a cutting edge located on at least a part of a ridgeline of the first surface and the second surface, wherein
the first surface comprises a groove which is located at a position away from the ridgeline and at an angle θ1 of 20-90° relative to the ridgeline,
the groove has a first end part being an end part closest to the cutting edge and a second end part being an end part most away from the cutting edge, and extends from the first end part to the second end part,
the groove comprises
an opening,
a bottom surface, and
a raised surface extended from the bottom surface toward the first end part, and the raised surface comprises
a plurality of first regions, and
a plurality of second regions,
a second region of the plurality of second regions is interposed between adjacent first regions of the plurality of first regions,
each of the plurality of second regions has an angle θ2 relative to the bottom surface larger than 135°, the angle θ2 being formed by the bottom surface and the raised surface, and
each of the plurality of first regions has the angle θ2 relative to the bottom surface within the range of 95-135°.

12. The insert according to claim 11, wherein the groove further comprises a lateral surface extended from the bottom surface to the opening, and
an angle θ3, which is on the base and which is formed by an imaginary surface along the cutting edge and the lateral surface, is 90° or more and is smaller than the angle θ2.

13. The insert according to claim 11, further comprising:
a plurality of grooves, including the groove, is located side by side, wherein
a width W of the opening of each of the plurality of grooves is 50-700 μm,
a depth D of said each of the plurality of grooves is 20-700 μm, and
spacing S between grooves adjacent to each other among the plurality of grooves is 50-700 μm.

14. The insert according to claim 11, wherein a relationship of W1<W2 is satisfied in which
W1 is a width of the opening at a position located 0.5 mm away from the first end part of the groove, and
W2 is a width of the opening at a position located 2.0 mm away from the first end part of the groove.

15. The insert according to claim 11, wherein a relationship of D1<D2 is satisfied in which
D1 is a depth of the groove at a position located 0.5 mm away from the first end part of the groove, and
D2 is a depth of the groove at a position located 2.0 mm away from the first end part of the groove.

16. The insert according to claim 11, wherein a relationship of (D2/D1)>(W2/W1) is satisfied in which
W1 is a width of the opening at a position located 0.5 mm away from the first end part of the groove, and
W2 is a width of the opening at a position located 2.0 mm away from the first end part of the groove, and D1 is a depth of the groove at the position located 0.5 mm away from the first end part of the groove, and
D2 is a depth of the groove at the position located 2.0 mm away from the first end part of the groove.

17. The insert according to claim 11, wherein
a maximum width of the groove is a width W of the opening.

18. The insert according to claim 11, wherein
the base is exposed in a first region of the first surface in a range within 0.5 mm from the cutting edge and the groove.

* * * * *